(12) United States Patent
Houghtaling et al.

(10) Patent No.: US 9,065,140 B2
(45) Date of Patent: Jun. 23, 2015

(54) PROCESS AND MATERIALS FOR MANUFACTURING AN ELECTRODE WITH REDUCED MUD CRACKING

(75) Inventors: Bradley M. Houghtaling, Rochester, NY (US); Jeanette E. Owejan, Honeoye, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 711 days.

(21) Appl. No.: 12/882,653

(22) Filed: Sep. 15, 2010

(65) Prior Publication Data

US 2012/0064434 A1 Mar. 15, 2012

(51) Int. Cl.
| | |
|---|---|
| *H01M 8/10* | (2006.01) |
| *B05D 5/12* | (2006.01) |
| *H01M 4/86* | (2006.01) |
| *H01M 4/88* | (2006.01) |

(52) U.S. Cl.
CPC .......... *H01M 4/8663* (2013.01); *H01M 4/8828* (2013.01); *H01M 4/8882* (2013.01); *H01M 8/1004* (2013.01); *H01M 2008/1095* (2013.01); *Y02E 60/50* (2013.01); *Y02E 60/522* (2013.01)

(58) Field of Classification Search
CPC ............ H01M 4/8663; H01M 4/8828; H01M 4/8882; H01M 8/1004; H01M 2008/1095; Y02E 60/50; Y02E 60/522

USPC ........ 429/483, 532, 535; 502/2, 101; 427/115
See application file for complete search history.

(56) References Cited

U.S. PATENT DOCUMENTS

| 4,849,253 A | * | 7/1989 | Maricle et al. ................. 427/115 |
| 6,050,509 A | * | 4/2000 | Clarey et al. ..................... 241/21 |
| 2006/0014073 A1 | * | 1/2006 | Kim et al. ........................ 429/42 |
| 2008/0182154 A1 | * | 7/2008 | Kim et al. ........................ 429/42 |
| 2010/0068589 A1 | * | 3/2010 | Saito et al. ....................... 429/30 |

FOREIGN PATENT DOCUMENTS

| TW | 200822436 | * | 5/2008 | .............. H01M 8/22 |

OTHER PUBLICATIONS

Machine translation of Xue (TW200800436).*
Drawings of TW200822436 (including figures), publish date May 2008.*

* cited by examiner

*Primary Examiner* — Jun Li
(74) *Attorney, Agent, or Firm* — Dinsmore & Shohl LLP

(57) ABSTRACT

A substantially crack-free electrode layer is described. The substantially crack-free electrode layer includes a substrate; and a substantially crack-free electrode layer on the substrate, the electrode layer comprising a catalyst, an ionomer, and a layered silicate reinforcement. Methods of making the electrode layer, electrode ink compositions, and membrane electrode assemblies incorporating the electrode layer are also described.

16 Claims, 5 Drawing Sheets

PROCESS AND MATERIALS FOR MANUFACTURING AN ELECTRODE WITH REDUCED MUD CRACKING

BACKGROUND OF THE INVENTION

Electrochemical conversion cells, commonly referred to as fuel cells, produce electrical energy by processing reactants, for example, through the oxidation and reduction of hydrogen and oxygen. A typical polymer electrolyte fuel cell comprises a polymer membrane (e.g., a proton exchange membrane (PEM)) with electrode layers (e.g., containing at a minimum one catalyst type and one ionomer type) on both sides. The catalyst coated PEM is positioned between a pair of gas diffusion media layers, and a cathode plate and an anode plate are placed outside the gas diffusion media layers. The components are compressed to form the fuel cell.

The catalyst layers can be attached to the PEM forming a membrane electrode assembly (MEA) (also known as a catalyst coated membrane (CCM)). One method of forming an MEA involves depositing an electrode ink on the PEM by direct spraying or coating in a shim frame. Alternatively, the electrode can be formed on a decal and transferred to the PEM. Alternatively, the catalyst/ionomer ink can be coated on a gas diffusion medium (GDM) substrate. This intermediate product is known as a catalyst coated diffusion media (CCDM).

Typically, the electrode ink includes powder catalyst on a support, such as a carbon support, and an ionomer solution which are dispersed in a mixed solvent. The mixed solvent usually contains one or more organic solvents, such as alcohols, and water in a specific ratio that depends on the type of catalyst. The mixture is then homogenized by ball-milling for up to about 3 days before coating on the PEM, decal substrate, or GDM. For shim coating, the catalyst loading can be controlled by the thickness of the shim; for the Mayer rod coating, the catalyst loading can be controlled by the thread number. Multiple coatings can be applied for higher catalyst loading, as needed. After applying the wet ink, the solvents are dried in an oven to drive off the solvent and form the electrode. After the catalyst/ionomer coated decal dries, the catalyst/ionomer is then transferred onto a PEM by hot press to form an MEA. The anode and cathode can be hot-pressed onto a PEM simultaneously. The pressure and time for the hot press may vary for different types of MEAs.

It is known that electrodes made from catalyst ink are prone to forming a network of cracks on the surface, which is called "mud cracking." It is well known that stresses develop as a wet film dries and the solid materials begin to consolidate. Although not wishing to bound by theory, the cracks may form due to non-uniform drying of the catalyst ink during fabrication of the electrodes. The cracks may also form following drying due to an inherent weakness of the electrode. The electrode is formed from a porous matrix of the carbon support bound by the ionomer, which is a relatively weak binder. As a result, the matrix of the carbon support within the ionomer may not be continuous. In addition, the carbon support provides minimal reinforcement to the ionomer, and the resulting matrix may not withstand the substantial stresses during the drying of the catalyst ink, resulting in a greater opportunity for the cracks to form during operation of the fuel cell. If the tensile strength of the film is insufficient to overcome the induced drying stress, mud cracks can form to relieve the film of the stress.

The network of cracks can negatively impact the performance of the fuel cell in several ways. For example, during the typical expansion and contraction of the electrolyte membrane during fuel cell operation, the base of the cracks can form a stress concentration on the adjacent electrolyte membrane, which may result in degrading the membrane, for example, forming pin-holes. In addition, the electrolyte membrane immediately adjacent to the crack is exposed to a different humidity environment than the electrolyte membrane immediately adjacent to the electrode. The expansion of the electrolyte membrane into the cracks can also degrade the electrolyte membrane, particularly after repeated expansion and contraction cycles. Furthermore, the network of cracks in the electrode can reduce the effective stiffness of the electrode, resulting in an undesirable movement of the MEA during fuel cell operation.

A number of methods for reducing mud cracking have been developed. One method involves increasing the time allowed for the catalyst ink to dry. However, increasing the drying time also increases manufacturing costs and may not be sufficient to reduce cracking. Increasing the drying time also may not optimize the resistance to cracking of the electrode during subsequent operation of the fuel cell.

Therefore, there is a need for making an electrode which reduces mud cracking.

SUMMARY OF THE INVENTION

The present invention meets this need. One aspect of the invention is a substantially crack-free electrode layer including a substrate; and a substantially crack-free electrode layer on the substrate, the electrode layer comprising a catalyst, an ionomer, and a layered silicate reinforcement.

Another aspect of the invention a method of fabricating a substantially crack-free electrode. In one embodiment, the method includes mixing a layered silicate reinforcement in a solvent to form a mixture; mixing the mixture with a catalyst and an ionomer to form an electrode ink; depositing the electrode ink on a substrate; and drying the electrode ink to form the substantially crack-free electrode layer.

Another aspect of the invention is a catalyst ink composition for a fuel cell. In one embodiment, the catalyst ink composition includes a catalyst supported on a plurality of electrically conductive particles; an ionomer; a solvent; and a layered silicate reinforcement.

Another aspect of the invention is a membrane electrode assembly. In one embodiment, the membrane electrode assembly includes a proton exchange membrane; a pair of gas diffusion media substrates on opposite sides of the proton exchange membrane; and a pair of electrode layers between the proton exchange membrane and each of the pair of gas diffusion media substrates, the electrode layers deposited on the proton exchange membrane or the gas diffusion media substrate, at least one of the electrode layers being substantially crack-free and comprising a catalyst, an ionomer, and a layered silicate reinforcement.

DETAILED DESCRIPTION OF THE INVENTION

Figure 1:
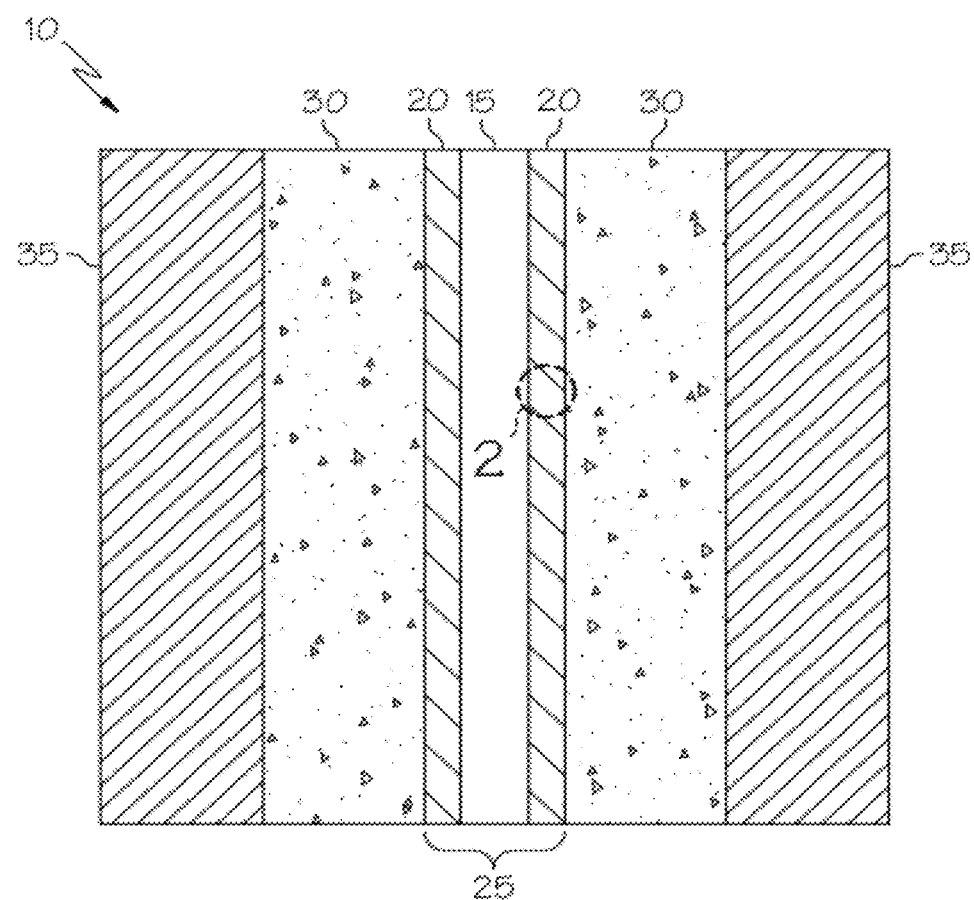
FIG. 1 is a schematic cross-section of one embodiment of a fuel cell.

FIG. 1 shows one embodiment of a fuel cell 10. The fuel cell includes a PEM 15 between a pair of electrodes 20. The electrodes 20 form a cathode and an anode for the fuel cell. The electrodes 20 may be deposited onto the PEM 15, as in the CCM design, to form an MEA 25. There is a GDM 30 adjacent to each of the electrodes 20. The electrodes 20 can be deposited onto the GDM, as in the CCDM design. Adjacent to each of the GDM is a fuel cell plate 35. These fuel cell plate can be unipolar or bipolar plates, as known in the art. The electrodes of the present invention can be used with any appropriate fuel cell components.

Figure 2:
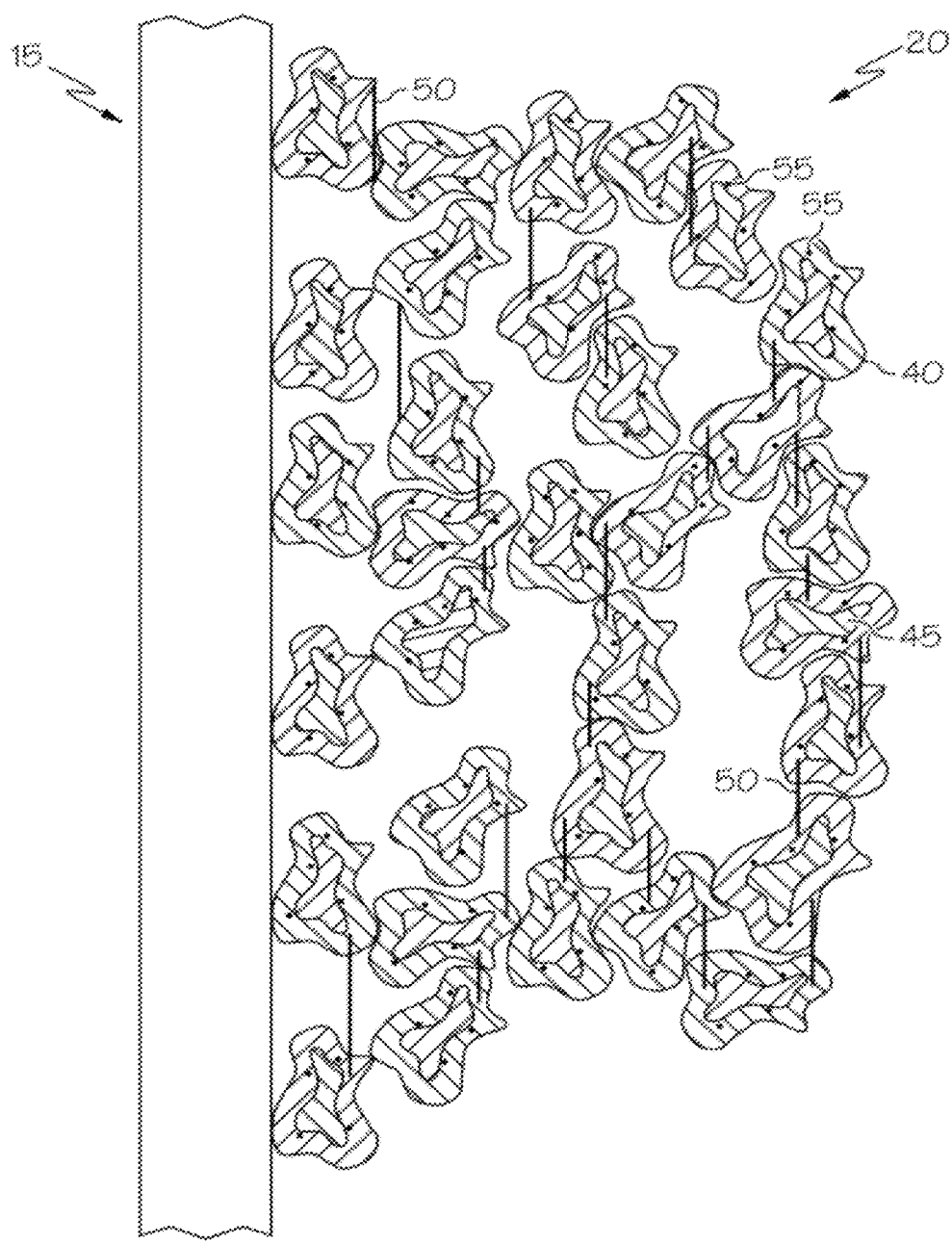
FIG. 2 is an illustration of a portion of an electrode showing the clay reinforcement bridging the conductive support particles of the electrode.
Figure 3:
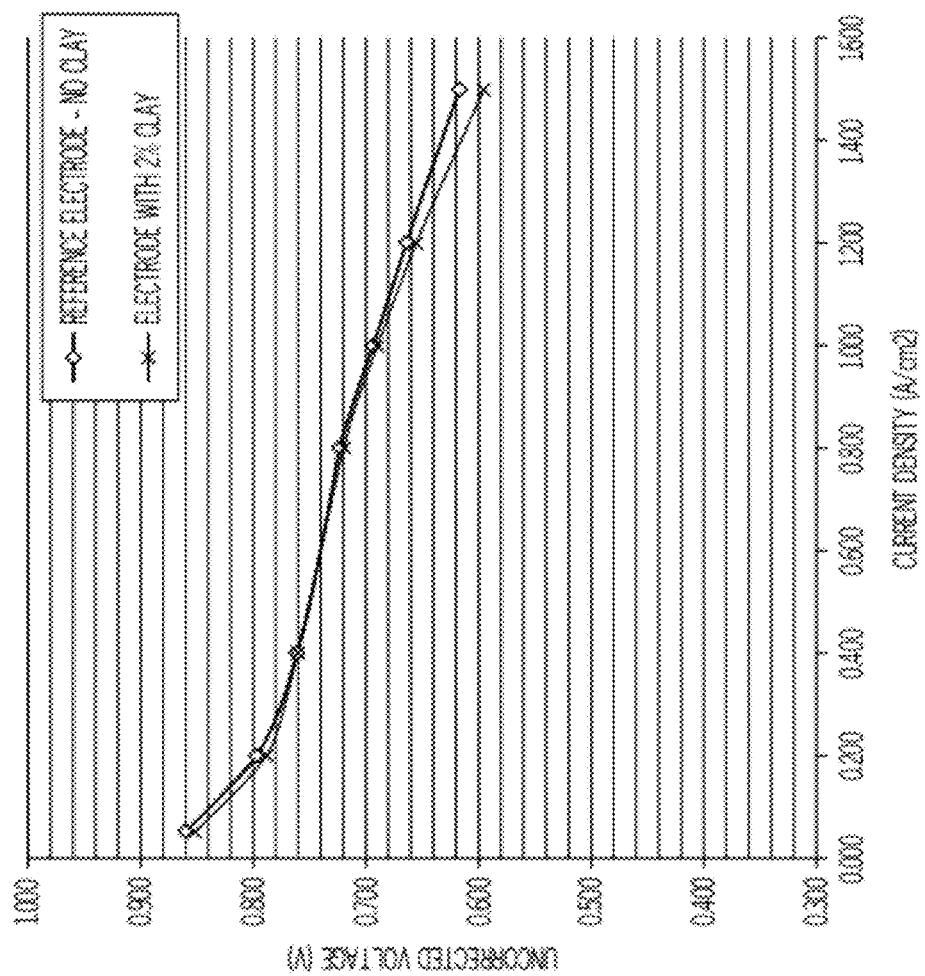
FIG. 3 is a graph showing voltage v. current density at low humidity.
Figure 4:
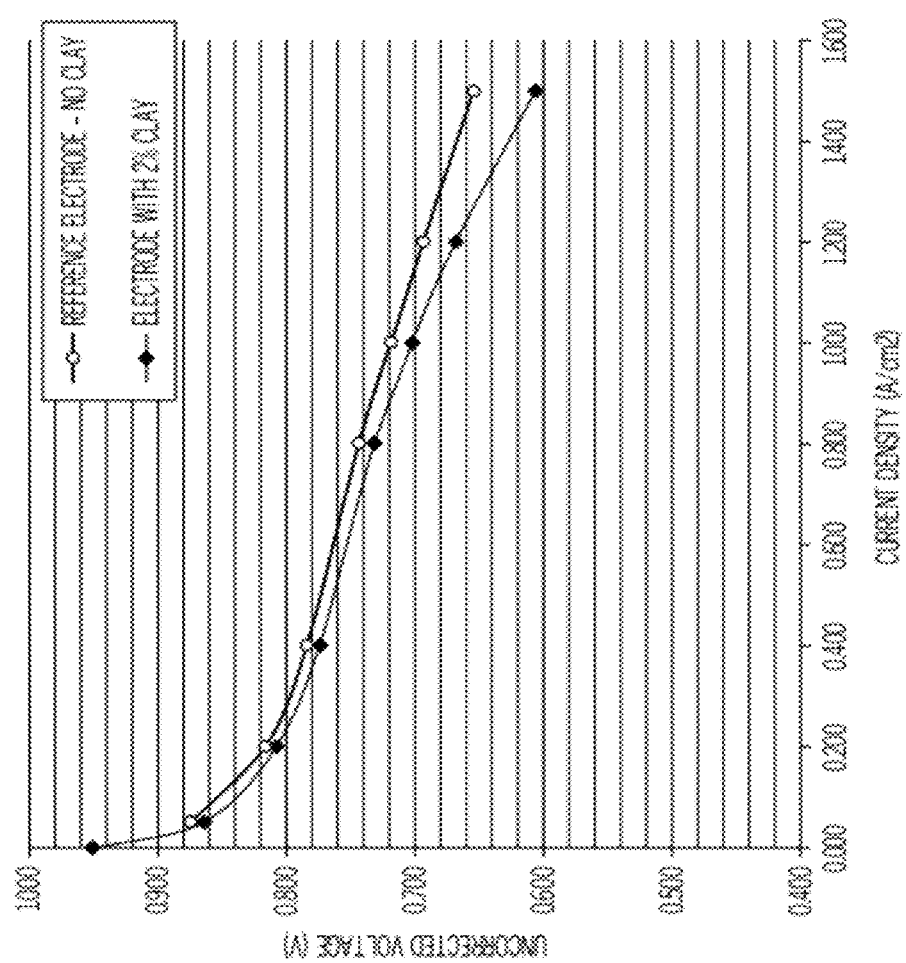
FIG. 4 is a graph showing voltage v. current density at high humidity.

FIG. 2 is an illustration of a particular structure of the electrode 20. The electrode 20 includes a matrix of ionomer 40 having a plurality of electrically conductive support particles 45 and layered silicate reinforcement 50 substantially evenly distributed throughout. The porous layer or matrix of ionomer 40 is formed from any suitable proton-conducting polymer that is substantially stable under the operating conditions and temperature associated with operation of the fuel cell 10. Suitable ionomer includes, but is not limited to, perfluorosulfonic acid (PFSA) polymer (for example Nafion® from the E.I, DuPont de Nemours and Co.), hydrocarbon ionomers such as sulfonated polyether ketones, aryl ketones, and polybenizimidazoles. Other proton-conducting polymers could also be used.

The electrically conductive support particles 45 support the catalyst 55. In the typical situation, the catalyst 55 is disposed on the conductive support particles 45, as opposed to the ionomer or the layered silicate reinforcement. The conductive support particles 45 can be formed from any material having sufficiently high electrical conductivity and surface area to be used in a fuel cell. Suitable conductive support particles include, but are not limited to carbon black, graphite, and activated carbon.

The catalyst 55 is a finely divided precious metal having catalytic activity. Suitable precious metals include, but are not limited to, platinum group metal, such as platinum, palladium, iridium, rhodium, ruthenium, and their alloys. The platinum group metal can be alloyed with other metals as well, if desired. Catalyst coated support materials are commercially available, as is known to those of skill in the art.

The layered silicate reinforcement is typically a clay. Although not wishing to be bound by theory, it is believed that the clay interacts with the ionomer, although there may also be some interaction with the support particles. The layered silicate reinforcement increases the tensile strength of the electrode.

Suitable layered silicates include, but are not limited to clays, including organically and inorganically modified clays, such as montmorillonite clays. The layered silicates would typically be about 70 to about 150 nm in the x-y direction, and about 1 nm thick. The layered silicates would typically have a surface area up to about 1000 m²/g.

The method allows the fabrication of a substantially mud crack-free electrode layer having a uniform thickness. It has been found that adding the layered silicate reinforcement to the electrode ink reduces or eliminates mud cracking of the electrode. It has been shown that a substantially mud crack-free cathode can extend the life of an MEA by eliminating damage to the membrane. By "substantially crack-free," we mean that very few cracks are visible under reflected light microscopy. The number of mud cracks is desirably as close to zero as possible.

The layered silicate reinforcement is generally at least partially exfoliated (e.g., there is at least some separation of the platelets). One method of exfoliating the layered silicate reinforcement involves sonicating a mixture of the layered silicate and a solvent, for example an organic solvent, for at least 30 min. Alternatively, the layered silicate, solvent, and ionomer can be sonicated. One or more solvents can be used, as desired. Suitable solvents include, but are not limited to, organic solvents and water. Suitable organic solvents include, but are not limited to, isopropyl alcohol, n-propyl alcohol, ethanol, or combinations thereof. Water is typically included in the mixture, although this is not required. It is believed that complete exfoliation of the layered silicate reinforcement is not required, and that partial exfoliation is sufficient. Any layered silicate that can be partially exfoliated in the solvent can be used. Clays such as montmorillonite clays, including organically modified montmorillonite clays and sodium-montmorillonite clays, both meet these criteria. The use of organically modified montmorillonite clay is desirable because it is compatible with the solvent system typically used in the coating inks.

The clay reinforcement is typically purified before exfoliation. The clay is extracted of ions so that the ionic conductivity and pH of the clay in DI (distilled) water is as close to the values of DI water as possible. This is done by immersing the clay in DI water (1 wt/wt % and a 5:1 weight ratio of a mixed resin: clay (for example, Amberlite IRN-150 resin from Rohm and Haas)). The clay, water, and resin bead mixture is stirred for 24 hours, and the clay is then separated and dried.

The catalyst-based inks typically contain solvent, water, ionomer, and catalyst, for example platinum. The electrode ink can optionally include one or more additional materials to improve the electrode properties, if desired.

The clay reinforcement is typically exfoliated separately with no ionomer present, although the ionomer could be included if desired. The ionomer and catalyst are then mixed with the exfoliated clay reinforcement. The ionomer can be in the form of a mixture of ionomer and solvent and water. The solvent can be the same as the solvent used in the exfoliation of the clay reinforcement, or it could be a different solvent. One or more solvents can be mixed with the ionomer, as desired. The mixture of the exfoliated clay reinforcement, solvent (one or more), ionomer, and catalyst is generally ball milled to obtain the electrode ink.

The electrode ink typically contains about 0.5 to about 6 wt % clay reinforcement based on the total solids (where total solids includes solid ionomer, catalyst, and clay reinforcement (and any additional solid materials if present)), or about 0.5 to about 5 wt %, or 0.5 to about 4 wt %, or 0.5 to about 3 wt %, or 0.5 to about 2 wt %, or 0.5 to about 1 wt %. It is desirable to use the smallest amount of reinforcement that will produce a substantially mud crack-free electrode.

The electrode ink can be deposited on any suitable substrate, including, but not limited to, GDM, PEM, or a decal substrate.

Catalyst based inks were produced which contained solvent, water, ionomer, and platinum containing catalyst. Exfoliated, purified clay was added to the ink. Using conventional coating techniques, such as slot die coating, the ink was applied to the GDM and dried. The resulting cathode was combined with the counter electrode and membrane to form an MEA.

EXAMPLE 1

Ink Preparation 34.9 g n-propyl alcohol, 9.0 g water, and 0.11 g nanoclay (Cloisite 10a available from Southern Clay Products of Gonzales, Tex.) (purified as described above) were weighed and placed in a container. The mixture was homogenized for 10 min. to break up large agglomerates and transferred to a jacketed glass vessel. The jacketed glass vessel was attached to a constant temperature bath set at 5° C. Using a sonication probe, the mixture was sonicated for 30 min. The mixture was then transferred to a container. 13.52 g ionomer (DuPont DE2020 PFSA) was added and mixed for 1 hour. Subsequently, 2.6 g Pt-alloy catalyst and 240 g 5 mm zirconia milling beads were weighed and placed in a separate container. The clay-ionomer mixture was added to the Pt-alloy catalyst and milling beads, and ball milled for 24 hr. The resulting ink contained 2 wt % clay by solids.

Electrode Coating Preparation

The nanoclay-containing ink was coated directly onto gas diffusion media (GDM). The target Pt loading was 0.2 mg Pt/cm$^2$. The coating was dried under an infrared (IR) lamp for 6 min. at 400° F. to form a catalyst coated diffusion media (CCDM). A thin film of ionomer was coated on the surface of the CCDM, with a target coating weight of 0.16 mg/cm$^2$. The coating was dried under an IR lamp for 4 min. at 400° F.

MEA Assembly 50 cm$^2$ pieces of the CCDM made above were used for the cathode. 50 cm$^2$ pieces of a CCDM having 0.05 mg Pt/cm$^2$ were used for the anode. A PFSA membrane was placed between the cathode and anode CCDM. The assembly was hot pressed at 295° F. under a force of 4000 lb for 2 min.

Figure 5B:
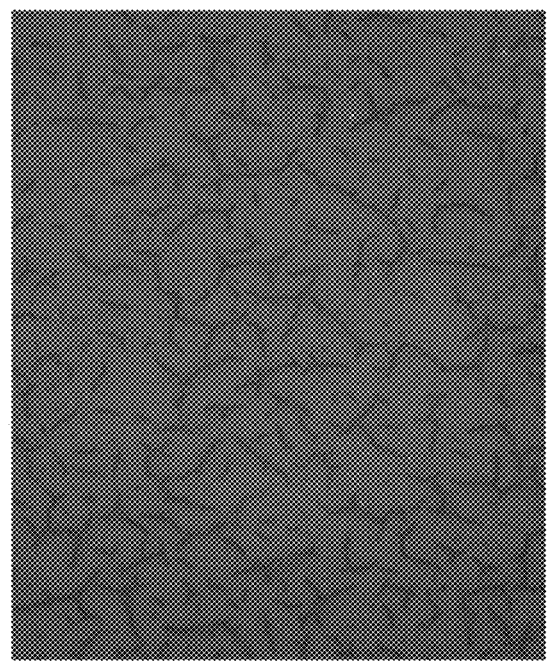
FIG. 5A-B are optical photographs showing electrodes made with and without clay.
Figure 5A:
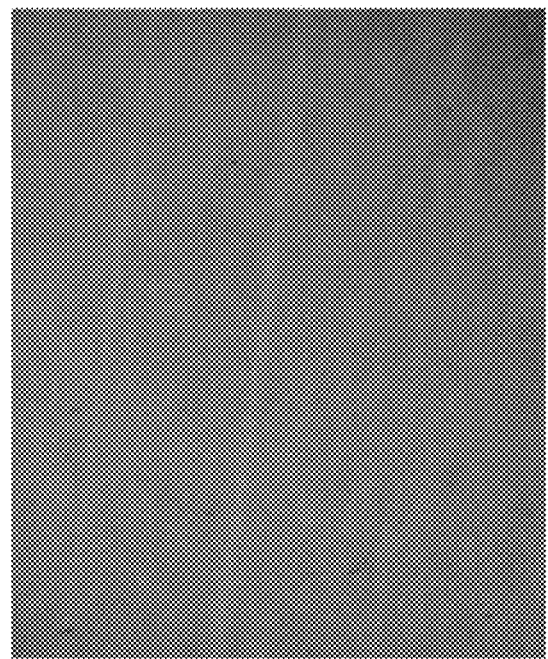

The MEAs were then tested in situ with a 50 cm$^2$ active area under moderately humidified as well as fully humidified conditions, as shown in FIGS. 1-2. As can be seen in the drier condition, the incorporation of the clay does not result in any loss in fuel cell performance. Under fully humidified conditions, however, there is a slight voltage loss at the highest current densities. Incorporation of even less clay can mediate this voltage penalty. Thus, the performance data shows that mud cracking can be mediated without affecting the electrode functionality. As shown in FIG. 5A-B, the unreinforced electrode showed severe cracking, while the 2 wt % clay reinforced electrode showed no cracking at five (5) times the magnification.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of fabricating a substantially crack-free electrode comprising:

providing a mixture of layered silicate reinforcement in a solvent;

sonicating the mixture to obtain at least partially exfoliated layered silicate reinforcement;

mixing the sonicated layered silicate reinforcement mixture with a catalyst-coated electrically conductive support particle and an ionomer to form an electrode ink; wherein the clay reinforcement is present in the electrode ink in an amount consisting of from 0.5-1.0 wt % based on the total solids of the electrode ink depositing the electrode ink directly on a gas diffusion medium; and drying the electrode ink to form the substantially crack-free electrode layer on the gas diffusion medium, the electrode layer having a matrix of ionomer with a plurality of catalyst-coated electrically conductive support particles and layered silicate reinforcement substantially evenly distributed throughout, the layered silicate reinforcement bridging the support particles.

2. The method of claim 1 further comprising sonicating the electrode ink before depositing on the gas diffusion medium.

3. The method of claim 1, further comprising purifying the layered silicate reinforcement before mixing the layered silicate reinforcement with the solvent.

4. The method of claim 1 wherein the layered silicate reinforcement is a montmorillonite clay.

5. The method of claim 1 wherein the solvent is a mixture of an organic solvent and water.

6. The method of claim 5 wherein the organic solvent is selected from isopropyl alcohol, n-propyl alcohol, ethanol, or combinations thereof.

7. The method of claim 1 wherein the electrically conductive support particle is selected from carbon black, graphite, and activated carbon.

8. The method of claim 1 wherein the ionomer is selected from perfluorosulfonic acid polymer, sulfonated polyether ketones, aryl ketones, and polybenizimidazoles.

9. The method of claim 1 wherein the catalyst is selected from platinum, palladium, iridium, rhodium, ruthenium, and alloys thereof.

10. A method of fabricating a substantially crack-free electrode comprising:

providing a mixture of montmorillonite clay, organic solvent, and water;

sonicating the mixture to obtain at least partially exfoliated montmorillonite clay;

forming an electrode ink comprising mixing the sonicated montmorillonite clay mixture with (i) a catalyst-coated electrically conductive support particle and (ii) an ionomer selected from perfluorosulfonic acid polymer, sulfonated polyether ketones, aryl ketones, and polybenizimidazoles; wherein the clay reinforcement is present in the electrode ink in an amount consisting of from 0.5-1.0 wt % based on the total solids of the electrode ink depositing the electrode ink directly on a gas diffusion medium; and drying the electrode ink to form the substantially crack-free electrode layer on the gas diffusion medium, the electrode layer having a matrix of ionomer with a plurality of catalyst-coated electrically conductive support particles and montmorillonite clay substantially evenly distributed throughout, the montmorillonite clay bridging the support particles.

11. The method of claim 10 further comprising sonicating the electrode ink before depositing on the gas diffusion medium.

12. The method of claim 10 wherein the organic solvent is selected from isopropyl alcohol, n-propyl alcohol, ethanol, or combinations thereof.

13. The method of claim 10 wherein the electrically conductive support particle is selected from carbon black, graphite, and activated carbon.

14. The method of claim 10 wherein the catalyst is selected from platinum, palladium, iridium, rhodium, ruthenium, and alloys thereof.

15. A method of fabricating a substantially crack-free electrode comprising:

providing a mixture of (i) montmorillonite clay; (ii) organic solvent selected from one or more of isopropyl alcohol, n-propyl alcohol, and ethanol; and (iii) water;

sonicating the mixture to obtain at least partially exfoliated montmorillonite clay;

forming an electrode ink comprising mixing the sonicated montmorillonite clay mixture with (i) a catalyst-coated electrically conductive support particle selected from carbon black, graphite, and activated carbon; and (ii) an ionomer selected from perfluorosulfonic acid polymer, sulfonated polyether ketones, aryl ketones, and polybenizimidazoles; wherein the clay reinforcement is present in the electrode ink in an amount consisting of from 0.5-1.0 wt % based on the total solids of the electrode ink depositing the electrode ink directly on a gas diffusion medium; and drying the electrode ink to form the substantially crack-free electrode layer on the gas diffusion medium, the electrode layer having a matrix of ionomer with a plurality of catalyst-coated electrically conductive support particles and montmorillonite clay substantially evenly distributed throughout, the montmorillonite clay bridging the support particles.

16. The method of claim 15 wherein the catalyst is selected from platinum, palladium, iridium, rhodium, ruthenium, and alloys thereof.

* * * * *